United States Patent [19]
Decker et al.

[11] Patent Number: 6,137,594
[45] Date of Patent: Oct. 24, 2000

[54] SYSTEM, METHOD AND PROGRAM FOR CONVERTING AN EXTERNALLY DEFINED COLORANT CMYK INTO AN EQUIVALENT COLORANT (C'M'Y'K') ASSOCIATED WITH A GIVEN PRINTER

[75] Inventors: William Chesley Decker, Longmont; Ho Chong Lee, Boulder; Jack Louis Zable, Niwot, all of Colo.

[73] Assignee: International Business Machines Corporation, Armonk, N.Y.

[21] Appl. No.: 08/823,734

[22] Filed: Mar. 25, 1997

[51] Int. Cl.[7] .............................. B41B 19/00; G03F 3/08; H04N 1/46; G06K 9/00
[52] U.S. Cl. ........................... 358/1.9; 382/162; 382/167; 358/518; 358/523; 358/504
[58] Field of Search ............................. 395/109; 382/162, 382/167, 186, 199; 358/518, 523, 525, 504, 508, 510

[56] References Cited

U.S. PATENT DOCUMENTS

| | | | |
|---|---|---|---|
| 4,642,680 | 2/1987 | Yamada | 358/78 |
| 5,121,196 | 6/1992 | Hung | 358/75 |
| 5,243,414 | 9/1993 | Dalrymple et al. | 358/500 |
| 5,289,565 | 2/1994 | Smith et al. | 395/131 |
| 5,323,249 | 6/1994 | Liang | 358/518 |
| 5,377,025 | 12/1994 | Spaulding et al. | 358/518 |
| 5,377,041 | 12/1994 | Spaulding et al. | 358/518 |
| 5,390,035 | 2/1995 | Kasson et al. | 358/518 |
| 5,481,380 | 1/1996 | Bestmann | 358/504 |
| 5,483,360 | 1/1996 | Rolleston et al. | 358/518 |
| 5,489,921 | 2/1996 | Dorff et al. | 345/153 |
| 5,500,921 | 3/1996 | Ruetz | 395/109 |
| 5,510,852 | 4/1996 | Shyu | 348/660 |
| 5,539,540 | 7/1996 | Spaulding et al. | 358/518 |
| 5,594,557 | 1/1997 | Rolleston et al. | 358/518 |
| 5,594,558 | 1/1997 | Usami et al. | 358/518 |

FOREIGN PATENT DOCUMENTS

WO 96/00411  1/1996  WIPO .............................. G03F 3/08

OTHER PUBLICATIONS

"PostScript Language Reference Manual", 2nd Edition, Adobe Systems, Inc., Addison–Wesley Publishing Co., pp. 305–307.

*Primary Examiner*—Leo H. Boudreau
*Assistant Examiner*—Dmitry A. Novik
*Attorney, Agent, or Firm*—Marilyn Smith Dawkins; David W. Victor; Konrad Raynes & Victor LLP

[57] ABSTRACT

Disclosed is a method, system, and program for converting an externally defined four dimensional colorant, e.g., CMYK, to an equivalent four dimensional colorant, e.g., C'M'Y'K', having components of a printer. A measurement is made of first color values, e.g., $L^*a^*b$, of a first set of patches having predetermined combinations of varying percentages of three primary colors, e.g., CMY, printed by the printer. Each combination of known CMY values are correlated with corresponding color values, e.g., $L^*a^*b$, as input to a first inversion program for determining CMY values for any given color value ($L^*a^*b$). A measurement is also made of second color values, e.g., $L^*a^*b$, of a second set of patches having predetermined varying percentages of a fourth colorant (K) printed by the printer. The first inversion program is used to determine CMY values corresponding to the color values, $L^*a^*b$, for the varying percentages of the fourth colorant (D). These determined CMY values corresponding to the second set of patches (D) and the known CMY values of the first set of patches are used to determine an equivalent fourth colorant substitution for the first patches having new CMY (C'M'Y') values and a corresponding percentage of the fourth colorant (D). Each combination of the C'M'Y' and K are correlated with associated color values as input to a second inversion program for determining C'M'Y'K' values for any given color values or equivalent values.

23 Claims, 4 Drawing Sheets

SYSTEM, METHOD AND PROGRAM FOR CONVERTING AN EXTERNALLY DEFINED COLORANT CMYK INTO AN EQUIVALENT COLORANT (C'M'Y'K') ASSOCIATED WITH A GIVEN PRINTER

CROSS REFERENCE TO RELATED APPLICATION

This application is related by common inventorship and subject matter to copending patent application Ser. No. 08/823,597 now U.S. Pat. No. 6,061,501 entitled "A System, Method and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

This application is related by common inventorship and subject matter to copending patent application Ser. No. 08/823,731 entitled "An Enhanced System, Method and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

This application is related by common inventorship and subject matter to copending patent application Ser. No. 08/823,596 now U.S. Pat. No. 5,987,168 entitled "A System, Method and Program For Converting Three Dimensional Colorants To more Than Three Dimensional Colorants" filed on even date herewith, assigned to the Assignee hereof and entirely incorporated herein by this reference.

BACKGROUND OF THE INVENTION

1. Field of the Invention

This invention relates to color printing, and more specifically, to converting a four dimensional color (CMYK), defined in terms of a standard or another printer, into an equivalent four dimensional color defined in terms of the colors (i.e., inks, toners, etc.) that are uniquely associated with a printer that is to perform the actual printing.

2. Description of the Related Art

For additive color processes such as used in display monitors, red, green, and blue are primary colors. In theory, mixing red, green, and blue light in various combinations can produce any color. For example, cyan is a mixture of green and blue and magenta is a mixture of red and blue. Black is the absence of any red, green, or blue; while white contains all three. A display monitor involves an additive process of light, and therefore, any color it produces can be defined in terms of red (R), green (G), and blue (B).

In a printing process, inks are typically deposited on white paper which already reflects the full amount of red, green, and blue. Instead of adding red, green and blue (RGB) together to produce any color, quantities of red, green, and blue are removed to produce a desired color. To do this, filters or inks have to be produced which filter individual primary colors, while not affecting the other two. The filter colors which accomplish this are the colors which are the complement of the primary colors. For example, yellow is the complement of blue. A blue filter, one which filters out blue light, passes red and green and thus appears yellow. Yellow ink can be thought of as an ink which removes blue. Thus, the complement of blue is yellow; the complement of red is cyan; and the complement of green is magenta. As such, cyan, magenta, and yellow are the primary colors in the subtractive color system and are known as the process colors in the printing industry.

Theoretically, with only three colors of ink: cyan (C), magenta(M) and yellow (Y), a printer could print any color. White can be obtained by putting no ink on the paper; and black can be obtained by putting cyan, magenta, and yellow on the paper, blocking all light. Realistically, however, the color obtained when placing cyan, magenta, and yellow on paper may not be pure black. It may be brownish. Consequently, black ink is typically added to the printing process color set. The black ink not only insures a richer black color, but it also reduces the amount of ink that has to be used to produce most colors. For example, if at any one place on the paper, quantities of C, M, and Y are placed, there will be a gray component which can be removed and replaced with black. This reduces the total amount of ink on the paper and produces better grays and blacks. In addition, it increases the gamut of the color set.

As a theoretical example of this process called black substitution or gray component removal, consider the following:

A color requires

Cyan=20%

Magenta=40%

Yellow=60%

In theory, the above color has a 20% gray component, the least common denominator. As such, 20% of each color could be removed and replaced with 20% black. The following will theoretically produce the same color.

New color mix

Cyan=0%

Magenta=20%

Yellow=40%

Black=20%

In the above example, 120 units of ink are replaced with 80 units of ink. Thus ink is saved. Colored inks usually cost more than black ink; thereby saving even more.

As shown above, color can be expressed in several ways. A color can be expressed in terms of percents of RGB (red, green, blue), CMY, (cyan, magenta, yellow) or CMYK (cyan, magenta, yellow, black). None of these color spaces, as they are called, are defined as to what color is produced by mixing combinations of each. Generally, these color spaces are referred to as being device dependent, since the color produced by a given CMYK mix on one printer will not produce the same color on another.

An attempt has been made in the United States to standardize the process color inks so that the colors can be predicted. A standard called SWOP (Specification for Web Offset Publication) has been published which standardized the process ink colors. Recently, the standard has been taken a step further and 928 combinations of CMYK have been defined as to what color will result in a device independent color space (CIE XYZ or CIE $L^*a^*b^*$). In Europe, a standard called Euroscale has been developed for four different paper surfaces. SWOP and Euroscale are very close, but not exactly the same.

In 1931, the organization called the Commission Internationale L'Eclairge (International Commission of Lighting), the CIE, met to try to establish a system of device independent color, color based on human sight. While attempting to define RGB, problems arose which persuaded the members to process the data through a matrix transform which produced a color space called CIE XYZ or XYZ. Since the XYZ color space is based on the human perception of color, any two different colors, even though the spectrum of these two colors may be different, will be perceived as the same color by a human if the XYZ values are the same under given lighting conditions.

From the XYZ color space, additional color spaces have been derived. One of these is called $CIEL^*a^*b^*$, pronounced C Lab, or $L^*a^*b^*$. This color space is based on XYZ of the color referenced to XYZ of the light source or paper. Most specifications such as the SWOP standard are specified in terms of XYZ and $L^*a^*b^*$ under a light source such as daylight D50. It is a three component color space with each color specified in terms of $L^*$, $a^*$, and $b^*$. $L^*$ specifies the lightness; and the hue and saturation are determined from the values of $a^*$ and $b^*$.

As previously discussed, a display monitor involves an additive process of light, and therefore, any color it produces can be defined in terms of RGB. However, a printing process is a subtractive process since it is printing on white paper, and therefore, color printers use cyan (C), magenta (M), and yellow (Y) or cyan, magenta, yellow and black (K), i.e., CMY or CMYK, to produce various colors. However, input files, such as a display monitors, scanners or other information used to print images are typically defined using RGB. Some input files can be defined in terms of CMY or CMYK. Input files may also be defined in device independent terms such as XYZ or $L^*a^*b$. Therefore, a conversion process has to take place in order to convert RGB, XYZ, or $L^*a^*b^*$ of an input file into CMY or CMYK for printing.

If the input file is RGB, XYZ, or $L^*a^*b^*$, it must be converted to CMY or CMYK. If the input file is CMY, the printer could print with CMY, but it may be more desirable to print using CMYK. If the input file is CMYK, no conversion is necessary.

3D to 3D Conversions

3-D color tables (such as CMY-to-$L^*a^*b^*$) and transformations among 3-D color spaces are straight forward and unambiguous or unique within the color gamut of the printer; and therefore, inversion schemes (e.g., from $L^*a^*b^*$ to CMY) are available. These schemes involve measurements of color patches of varied color amounts at specified intervals (e.g., creating a 9×9×9 matrix, i.e., 729 patches) to form a CMY lattice and a corresponding $L^*a^*b^*$ (or other color space) lattice (corresponding to CMY 9×9×9 for the example given here). These primary lattices can be denoted by (CMY)p and ($L^*a^*b^*$)p. An interpolation method is used to establish one-to-one correspondence between points in these lattices. The so called color rendering dictionaries are constructed using such interpolation algorithms. If such rendering dictionaries have been established, finding CMY for a given $L^*a^*b$ value becomes a simpler task.

$L^*a^*b^*$ to CMY Conversion

Coordinates for device independent color space are specified in $L^*a^*b^*$. However, printers typically use CMY colors. It is therefore necessary to convert from $L^*a^*b^*$ to CMY. Converting to CMY involves a three dimensional (3D) to three dimensional (3D) conversion process. It should be noted that well known, commonly used, methods can be used to perform 3D to 3D conversions, such as $L^*a^*b^*$ to CMY.

For example, a $L^*a^*b^*$ to CMY transfer involves making print sample patches using the printer for which the conversion is desired. The print patches are made up of combinations of C, M, and Y. Typically, there are nine patches of each (making a 9×9×9 sample layout having 729 patches) with each color at 0%, 12.5%, 37.5%, 50%, 62.5%, 75%, 87.5%, and 100%. For each one of the 729 patches the exact percent of cyan, magenta, and yellow is known. Then, each print sample, i.e., patch, is measured and its CIE $L^*a^*b^*$ calculated. A table is created having various percentages of CMY with its corresponding $L^*a^*b^*$ value. To express C, M and Y in terms of equal increments of $L^*a^*b^*$, known inversion and interpolation techniques are employed. For any given $L^*a^*b^*$ value received as input, that $L^*a^*b^*$ value is located in the table and the corresponding percentages of CMY are found. If the same $L^*a^*b^*$ value is not in the table, interpolation is used or out-of-gamut mapping is used. Out-of-gamut mapping occurs if the $L^*a^*b^*$ value is beyond the volume or color space of colors that a printer is able to produce. Any $L^*a^*b^*$ value that lies within this volume is something that can actually be accurately reproduced by the printer. Since any given printer has its limitations and cannot print every possible color, out-of-gamut means that a given $L^*a^*b^*$ is outside the capability of the printer. There are many well-known out-of-gamut mapping techniques. Basically, these techniques try to get to the point on the surface of the color volume of the printer that is the closest color match.

RGB to CMY Conversion

Converting from RGB to CMY merely involves a process that represents the relationship between complementary colors. The subtractive color primaries cyan, magenta, and yellow are the complements of the additive primaries red, green, and blue. Therefore, in theory, the conversion is:

cyan=1.0−red magenta=1.0−green yellow=1.0−blue

For example, a color that is 0.2 red, 0.7 green, and 0.4 blue can also be expressed as 1.0−0.2=0.8 cyan, 1.0−0.7=0.3 magenta, and 1.0−0.4=0.6 yellow.

3D to 4D Conversions

CMY to CMYK Conversion

Converting from CMY to CMYK involves using black generation and under color removal to generate a black component. Under color removal reduces the amount of cyan, magenta, and yellow components to compensate for the amount of black that was added by the black generation. The percentage of black used is the minimum percentage that is used by cyan, magenta or yellow. The altered amount of CMY that is then used is the original amount minus the percentage amount used for black.

For example, for an input file defined in CMY, the conversion to C'M'Y'K is as follows:

K=min (C,M,Y)

C'=C−K

M'=M−K

Y'=Y−K

For this conversion, it is assumed that the inks are a perfect dye such that a mixture in equal amounts of CMY will produce black or a perfect gray, i.e., a block dye. The above illustrates one way to convert CMY to CMYK.

A side effect from converting from CMY to CMYK is that the gamut may be reduced, i.e., the number of colors that are produced (the color space) may be reduced, due to loss of hue. This side effect can be compensated for by using an under color addition process. The under color addition process regains lost hues and expands the gamut. This process results in new percentages of CMYK noted below as C"M"Y"K". The process uses the following well-known formulas from classical theory:

$$C'' = \frac{C'}{1-K} = \frac{C-K}{1-K}$$

$$M'' = \frac{M'}{1-K} = \frac{M-K}{1-K}$$

$$Y'' = \frac{Y'}{1-K} = \frac{Y-K}{1-K}$$

$$K'' = K' = K$$

RGB to CMYK Conversion

A combination of processes including the RGB to CMY conversion and the CMY to CMYK conversion can be used to convert from RGB to CMYK.

$L^*a^*b^*$ to CMYK Conversion

This conversion involves the 3D interpolation scheme and out-gamut mapping scheme discussed above for transforming $L^*a^*b^*$ to CMY. This involved creating CMY patches (e.g., 9×9×9), measuring for $L^*a^*b^*$ values and interpolating, if necessary, to get a CMY value for a given $L^*a^*b^*$ input value. Then the above process for converting CMY to CMYK can be used.

The problem with the above conversion processes, especially the ones that convert CMY to CMYK, i.e., a 3D to 4D conversion, is that these processes are based on theoretical colors and color relationships. A printer may not be capable of producing such theoretical colors.

In addition, since printers typically have four colors, CMYK, for printing, but input files are typically defined using three color values (e.g., RGB, $L^*a^*b^*$), an equivalent color set of more than three colors must be found for every color obtained with combinations of three primary colors. Transforming a three dimensional system to four or higher dimensions provides no unique solution. The well-known simple scheme described above is based on the ideal dies known as block dies which yields perfect black or grey (w/o hue) whenever equal amounts from C, M, and Y are overprinted over a given area. Then, for any given set of 3 primaries, an equal amount is removed from each color component and the same amount of black can be added without changing the color value. The amount of ink saved is twice the amount of black added. The amount of CMY replaced can vary from zero to the lowest of the three colorants—a fact which indicates that this process is not unique. For real colorants, combining equal amounts of three colorants will not result in ideal grey/black. Thus, the choice of black replacement becomes ambiguous.

In some situations it is desirable to convert a four color combination (e.g., CMYK) to an equivalent four color combination of the same colors (CMYK). For example, the printing press industry has their own standard and specification for CMYK (e.g., SWOP standard). Each different standard and specification of CMYK will result in different $L^*a^*b^*$ values for a same percentage amount of CMYK. In addition, the $L^*a^*b^*$ values for a given CMYK combination defined by a standard will be different for that same CMYK combination that is printed by any given printer. This is because the various toners or inks used by printers will produce their own different $L^*a^*b^*$ values. Toners and inks having different formulations will produce differing $L^*a^*b^*$ values. Any color combination (e.g., CMYK) that is specified as having certain color values (e.g., $L^*a^*b^*$ values) which do not take into consideration the characteristics of the colors of the printer that is to perform the printing, is referred to herein as being externally defined. For example, an externally defined color combination (e.g., CMYK) may be specified by the SWOP standard, any other standard, or by the characteristics (inks/toners) of another printer (as would be done for a proofing application). In many cases, a printer job will be received in which the four dimensional colorant (CMYK) is externally defined. Therefore, the printer that is to perform the printing must convert the received externally defined CMYK values into equivalent CMYK values that take into consideration the colors (i.e., inks, toners, etc.) and capabilities of the given printer. A CMYK of a printer (C'M'Y'K') is equivalent to an externally defined CMYK if the $L^*a^*b^*$ values are the same.

Therefore, it is desirable to convert an externally defined CMYK to its corresponding $L^*a^*b^*$ values and to use these $L^*a^*b^*$ values to find an equivalent C'M'Y'K' combination for a given printer. This transformation can be depicted as $$(CMYK)STD \rightarrow (L^*a^*b^*)_{STD} = (L^*a^*b^*)_{PRTR} \rightarrow (C'M'Y'K')_{PRTR}$$

The problem is that there is not a one-to-one mapping from $L^*a^*b^*$ to CMYK. That is, there is not a unique combination of CMYK for a given $L^*a^*b^*$.

SUMMARY OF THE INVENTION

It is therefore an object of this invention to modify the above well-known conversion processes to take into account the colors actually produced by a printer.

It is therefore a further object of this invention to convert an externally defined four dimensional colorant (e.g., CMYK) into an equivalent four dimensional colorant (e.g., C'M'Y'K') that takes into consideration the colors and capabilities of the given printer that is to perform the printing functions.

It is a further object of this invention to find a unique and equivalent combination of four colors of a printer (e.g., C'M'Y'K') from three dimensional color values (e.g., $L^*a^*b^*$ values) specified for an externally defined four dimensional colorant (e.g., CMYK).

The system, method, and program of this invention determine a unique combination of four colorants of a given printer (e.g., C'M'Y'K') that is equivalent to an externally defined four colorants (e.g., (CMYK)) by converting the color values (e.g., $L^*a^*b^*$ values) of the externally defined four colorants to equivalent four colorants of a printer.

One technique for doing this is disclosed in copending patent application Ser. No. 08/823,597, now U.S. Pat. No. 6,061,501, entitled "A System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

Another technique for doing this is disclosed in copending patent application Ser. No. 08/823,731 entitled "An Enhanced System, Method, and Program For Converting An Externally Defined Four Dimensional Colorant (CMYK) Into An Equivalent Four Dimensional Colorant Defined In Terms Of The Four Inks (C'M'Y'K') That Are Associated With A Given Printer" filed on even date herewith, assigned to the Assignee hereof and entirely incorporated herein by this reference.

The two techniques described in the above two described copending patent applications make the assumption that the $a^*$ and $b^*$ values, of measured $L^*a^*b^*$ values, are zero or are near zero for various percentage amounts of a fourth colorant (e.g., black, (K)) printed by the printer. The preferred embodiment described herein determines a unique solution when converting from externally defined four colorant combinations to four colorant combinations of a printer without requiring such an assumption.

The preferred embodiment described herein utilizes a technique for converting a three dimensional color space (e.g., defined in terms of $L^*a^*b^*$) to more than three dimensional colorants as described in copending patent application Ser. No. 08/823,596 now U.S. Pat. No. 5,987,188 entitled "A System, Method, and Program For Converting Three Dimensional Colorants To More Than Three Dimensional Colorants" filed on even date herewith, assigned to the Assignee hereof and entirely incorporated herein by this reference. The technique takes into account the colors and color values of the colors that a given printer is actually capable of printing. The technique also uses a fourth color substitution process that results in an unambiguous fourth color replacement percentage amount.

The system, method, and program converts a three dimensional color space to a color space having four or more color components consisting of the colors of ink of a given printer. A color rendering dictionary or look up table is loaded into a printer controller that converts given $L^*a^*b^*$ input values (which are the color values that have been externally specified for four colorants, e.g., CMYK) to equivalent four colorant combinations of the printer's inks.

The color rendering dictionary or look up table is based on patches, printed by the printer, of known (i.e., predetermined) combinations of varying percentages of three primary colors (e.g., CMY), and of patches, printed by the printer, of predetermined varying percentages of a fourth colorant. $L^*a^*b^*$ values of these printed patches are measured. The predetermined combinations of varying percentages of the three primary colors and the predetermined percentages of the fourth colorant, along with their associated $L^*a^*b^*$ values are inputted into a computer program. The program then uses an interpolation and inversion program to determine corresponding CMY values for each of the percentages of the fourth colorant based on the measured $L^*a^*b^*$ value for each of the percentages of the fourth colorant.

The computer program then finds an equivalent combination of four colorants for the various combinations of three colorants printed out by the printer. Generally, there may be more than one four colorant combination equal to a given three color combination (CMY). However, in the preferred embodiment of this invention, an inversion algorithm, referred to as maximum K-substitution, is utilized that circumvents the ambiguity in choosing the fourth colorant, e.g., black (K), replacement when converting from a 3-D to 4-D color system. Using the maximum K-substitution, one of the components of the three colorant combination will be at or near zero which is the lowest possible value without having any negative colorant when the CMY values for a given percentage of the fourth colorant are subtracted from the CMY values of a given CMY combination. More specifically, for every color patch consisting of all three components in the original CMY combination, all percentages of the fourth colorant, K, are located whose CMY value can be subtracted without reducing to negative values. Of all K's found, the maximum K is chosen as the percentage of the fourth color and the corresponding CMY value is subtracted from the CMY values of the originally given CMY combination. A given CMY combination will then have an equivalent CMYK combination, e.g., C'M'Y'K'.

As a further enhancement, another preferred embodiment may add the step of under color addition to compensate for the loss of hue when the fourth colorant, K, replaces some amounts of the supposedly equivalent CMY combination. This will create a different four colorant combination having new values referred to as C"M"Y"K".

The computer program then produces a seven column table with equal number of rows of original CMY. The columns comprise the C'M'Y'K' values (or C"M"Y"K" if under color addition was used) and the corresponding $L^*a^*b^*$ values of the CMY combination that was replaced by the new four colorant combination. As a further enhancement, patches of the C'M'Y'K' or C"M"Y"K" combinations can be printed by the printer and actual $L^*a^*b^*$ values measured for each of these patches. The seven column table would then consist of measured $L^*a^*b^*$ values of varying percentages of the four colorant combination. This table is then used as input to an inversion program having an interpolation algorithm to create a color rendering dictionary. This color rendering dictionary can be loaded into the printer controller. Upon receipt of an inputted $L^*a^*b^*$ value (corresponding to an externally defined four colorant combination), the printer controller then determines an equivalent four colorant combination.

The above technique uses inversion/interpolation algorithms to convert CMYK and/or $L^*a^*b^*$ into CMYK space.

BRIEF DESCRIPTION OF THE DRAWING

For a more complete understanding of this invention, reference is now made to the following detailed description of the embodiments as illustrated in the accompanying drawing, wherein.

DETAILED DESCRIPTION OF THE PREFERRED EMBODIMENTS

Figure 1:
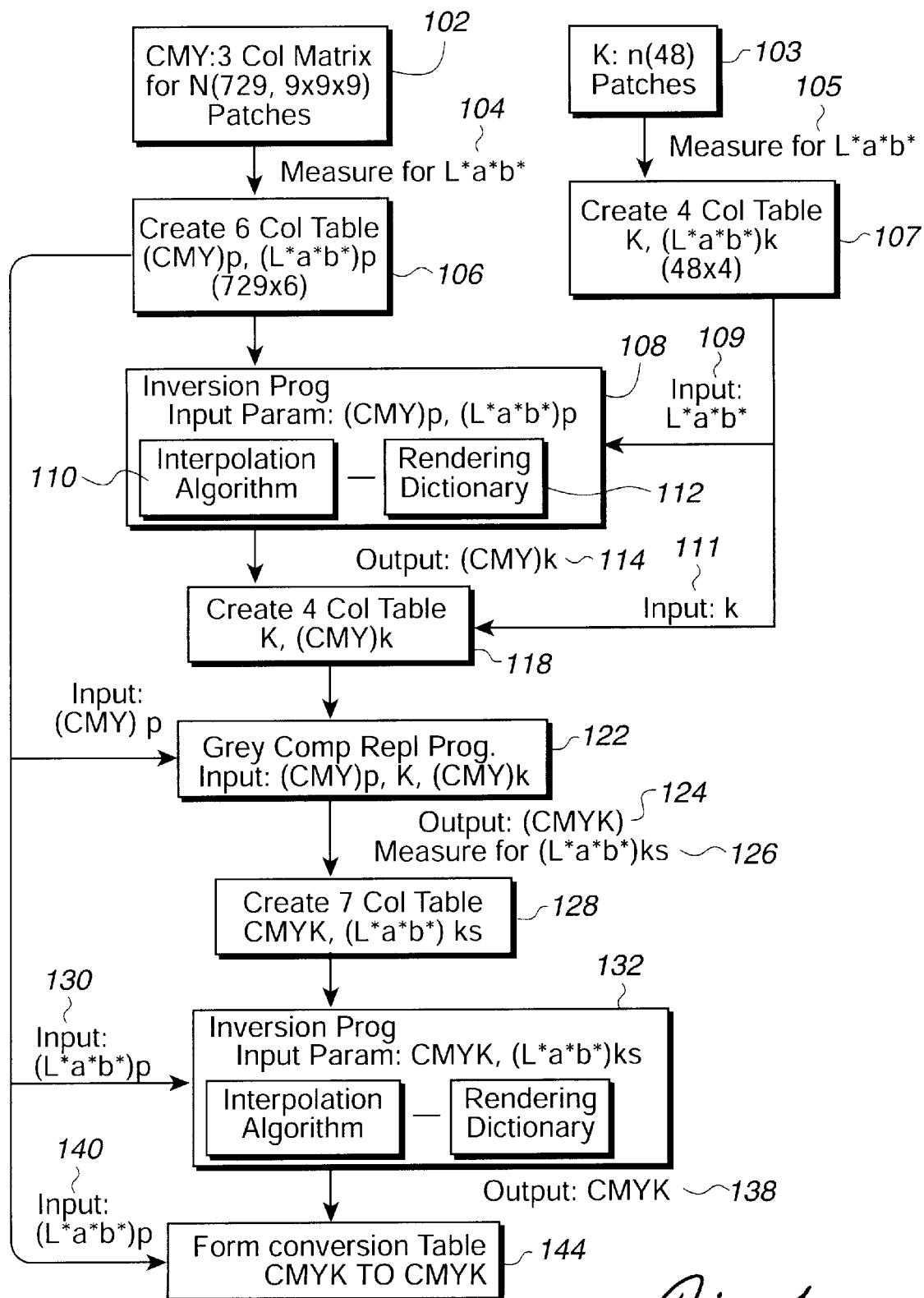
FIG. 1 is a flow chart showing the process steps of this invention.

The system, method, and program described in the preferred embodiment of this invention converts an externally defined four dimensional colorant (CMYK) into an equivalent four dimensional colorant (C'M'Y'K') which has the same $L^*a^*b^*$ values as the externally defined CMYK by using a conversion process from a 3D color space to a 4D or more color space.

The steps that are taken to convert one set of CMYK to another are described as follows:

1) A table is obtained from a standard (such as SWOP) that gives the $L^*a^*b^*$ values for combinations of C, M, Y, and K for the standard.

2) Alternatively, if a table does not exist, a relationship going from CMYK of the standard to $L^*a^*b^*$ is established via measurement of generated color patches using inks specified by the standard.

3) A relationship is established between $L^*a^*b^*$ and the C, M, Y, K values of the printer.

4) The relationship or look up table from step 1 or 2 above, along with appropriate interpolation, are used to obtain $L^*a^*b^*$ values from C, M, Y, K of the standard.

5) The relationship or look up table of step 3 above is used to get the C, M, Y, K values of the printer from the $L^*a^*b^*$ of step 4) above.

6) As an alternative step, steps 4 and 5 can be combined to establish a relationship or look up table that goes from an externally defined CMYK combination to a CMYK combination of the printer directly.

The implementation of steps 2 and 3 are key components of steps 5 and 6, and are described in more detail as follows:

For step 3 above:

a. Print patches of increments of each color, i.e., percents of C, M, Y and K respectively. Additionally print patches of all combinations of C, M, Y, and K. Typically, ten increments are taken (0, 10, 20, 30%, etc.) of each color. The corresponding $L^*a^*b^*$ values are measured for each patch, and are measured via a spectrophotometer or other color value measuring device. Thus a look up table going from CMY of the printer to $L^*a^*b^*$ is established.

b. Using an appropriate inversion and interpolation scheme and gamut mapping, the relationship can be obtained going from $L^*a^*b^*$ to C, M, Y.

c. Using the patches of K and their $L^*a^*b^*$ values, equivalent values of C, M, Y can be found for each value of K. Using this and under color addition C, M, Y is converted to C, M, Y, K.

d. All of the C, M, Y patches are converted to equivalent C, M, Y, K patches and their $L^*a^*b^*$ values are measured.

e. C, M, Y, K of the printer can now be obtained from the $L^*a^*b^*$ values using the interpolation and inversion scheme of step b.

The description of step 2 is similar to that of step 3. In this case, the values of $L^*a^*b^*$ for the standard may already be given for the various patches of C, M, Y, and K.

The system, method, and program of the preferred embodiment of this invention is described in more detail with reference to the drawing.

First, with reference to FIG. 1, the typical 9×9×9 CMY patches are created by the printer, step 102. In a preferred embodiment, nine different percentages of color are used for each color component. For example, for cyan, there would be color patches having 0%, 12.5%, 37.5%, 50%, 62.5%, 75%, 87.5%, and 100% of cyan color. Each one of these percentages are combined with these same nine different percentages of magenta. In addition, each one of the 9×9 combinations of cyan and magenta are combined with these same nine different percentages of yellow to create the 9×9×9 color combinations. Near equal increments of each color can also be utilized, where the increments are based upon piecewise linear steps of each color. These 9×9×9 printed patches have known percentages of CMY components. By measuring each patch's $L^*a^*b^*$ values, step 104, a six column look up table 106 having the known percentages of CMY, i.e., (CMY)p, and their corresponding $L^*a^*b^*$ values, i.e., $(L^*a^*b^*)$p, can be generated. This table can be used as input to an inversion program 108 to create a rendering dictionary 112. An interpolation algorithm 110 is used to determine a corresponding CMY value for any given $L^*a^*b^*$ input value 109. Various inversion programs are utilized by the preferred embodiment of this invention. Basically, an inversion program, which has as its input a set of parameters (e.g., CMY) and other corresponding parameters (e.g., $L^*a^*b^*$), can determine the parameters (e.g., C'M'Y') within the set of parameters (e.g., CMY) given a corresponding parameter (e.g., $L^*a^*b^*$). That is, it is capable of "inverting" the process for finding parameters. Instead of finding a $L^*a^*b^*$ for a given CMY value, it finds a CMY value for a given $L^*a^*b^*$. Inversion and interpolation schemes create nodel points of the (CMY)p values. These values are mapped into corresponding $(L^*a^*b^*)$p nodel points. The inversion program locates the $(L^*a^*b^*)$p nodel points that surround a particular $L^*a^*b^*$ point (one from a table with equal increments of $L^*a^*b^*$) and maps it back to a particular value of CMY. This CMY value is found via interpolation.

In addition, to add the fourth colorant, e.g., K(black), to the color table, the method first requires characterizing the colorant by measuring $L^*a^*b^*$ values at specified intervals of colorant amount. For example about fifty shades of black (K) patches ranging from 0% black to 100% black would be printed, step 103. Any number of black patches could be used; however, the more black patches there are the better the results. Each patch is then measured for its $L^*a^*b^*$ value, step 105. A spectrophotometer or other color value measuring device is used. This establishes the relationship, $L^*a^*b^*$ versus color amount K, i.e., $L^*(k)$, $a^*(k)$, $b^*(k)$ vs. K, 107 thereby generating a four column table. For black, $a^*$ and $b^*$ values are usually zero but unlike the block die, they are not required to be zero for the method of the preferred embodiment.

Each one of the 50 $L^*a^*b^*$ values for black, i.e., $50(L^*a^*b^*)$k, should have a corresponding CMY value, i.e., 50 (CMY)k, either matched or interpolated, via an inversion program, from the 9×9×9 combination of patches of CMY for which the $L^*a^*b^*$ values have been measured. There is no guarantee that the 729 patches of combinations of CMY will produce measured $L^*a^*b^*$ values that exactly correspond to the measured $L^*a^*b^*$ values of the black patches. However, an interpolation algorithm 110 and color rendering dictionary 112 can be used to find a (CMY)k value 114 for a black patch having a $L^*a^*b^*$ value even if it does not exactly correspond to a $L^*a^*b^*$ value of one of the 729 patches. Finding the corresponding (CMY)k values for a black patch having a measured $L^*a^*b^*$ value, either exactly or by interpolation, from the measured $L^*a^*b^*$ values of the known CMY percentages of each one of the 729 patches is referred to herein as an inversion process 108. As such, the inversion process finds the CMY value that will make a given shade of black. Therefore, for each patch of black, the CMY value, (CMY)k, is determined. By using the inversion algorithm and rendering dictionary interpolation, a table of CMY for each value of K, i.e., K versus CMY, can be obtained. These CMY will be called Ck,Mk,Yk or (CMY)k. These (CMY)k values are equivalent to the corresponding K in terms of $L^*a^*b^*$ values. They are the amounts which can be removed from a color and replaced by the corresponding K if the result does not give a negative colorant.

In summary, for the first step of the process, every K has a $L^*a^*b^*$ value which can be expressed in terms of an equivalent value of C,M, and Y. A table is produced of (CMY)k for each input value of K, 111, i.e., K versus (CMY)k, 118. Although discrete steps of K's are used in the table, it is understood that intermediate points can be interpolated using any of the interpolation formulas.

The second step involves K (i.e., black) substitution. The original 9×9×9 CMY table (referred to herein as "(CMY)p") is modified with K (i.e., the 4th color) substitution using the K versus (CMY)k table. A decision must be made as to the replacement percentage. In the preferred embodiment of this invention, the maximum K-substitution scheme will be illustrated which results in one of the CMY components being near zero which is the lowest possible without going into negative colorant. For nonmaximum substitutions, the percentage replacement must be specified allowing minimum colorants retained when the colorants are reduced. Typically, the maximum allowable value of K should be used. The K-substitution, step 122, proceeds as follows.

For every (CMY)p which has a non-zero value (i.e., C≠0, M≠0, or Y≠0), the K versus CMY, i.e., (CMY)k, table is used to find the greatest K percentage where the corresponding (qMY)k values, when subtracted from (CMY)p, do not result in any negative value. That is, Cp−Ck≧0, Mp−Mk≧0, and Yp−Yk≧0. If desired, the K value can be selected where a value of one of the components of (CMY)k will reduce the value of one of the components of (CMY)p to zero. This is not essential in practice, but can be accomplished by using either finer K versus (CMY)K tables or through interpolations.

In other words, for each original CMY, i.e., (CMY)p, the lowest value of either Cp, Mp or Yp is found. For example, assume Mp was the lowest value of Cp, Mp and Yp. The value for Mp is then matched, either exactly or through interpolation, with an Mk value in the K versus (CMY)k table. Since there most likely will be more than one of such values, the Mk value chosen from the table is the one that corresponds to the greatest K percentage value without having a negative colorant after the subtraction process. The Ck, Yk, and K values that correspond to that Mk value are selected along with the Mk value.

These values are then subtracted from the original (CMY)p values resulting in new output values, 124, for C, M, and Y designated herein as C', Y', M', and K' respectively, or as referred to herein as (CMYK)' or (CMYK)k, as follows:

C'=Cp−Ck
M'=Mp−Mk
Y'=Yp−Yk
K'=K

The goal is to subtract out as much as possible, especially for the component that has the lowest percentage, i.e., in the above example "M".

As a result, a 7-column table is produced having the new values of CMYK and the corresponding $L^*a^*b^*$ values from the original 9×9×9 sample patches, i.e., $(L^*a^*b^*)p$. The 7 columns represent C', M', Y', K', $L^*p$, $a^*p$, and $b^*p$, step 128.

To improve the match between (CMY)p and (CMYK)k, i.e., C',M',Y',K', the next step involves printing 729 new patches using the C', M', Y', K' values from above. The $L^*a^*b^*$ of these patches is then measured again, step 126. These new $L^*a^*b^*$ values, $(L^*a^*b^*)$ks may differ from the previous values due to the black substitution. A look up table can be made correlating C'M'Y'K' values with the new corresponding $(L^*a^*b^*)$ks values. This table can be used as the new parameters for the inversion algorithm or the new rendering dictionary inputs, 132. It is important that the new $L^*a^*b^*$ nodel points associated with C'M'Y'K' are similar or very close to those established for (CMY)p. This will insure the accuracy of the inversion and interpolation algorithms. Then $(L^*a^*b^*)p$, 130, is inverted to obtain the new (CMYK) k, 138. From the externally defined $L^*a^*b^*$ values for CMYK combinations, the externally defined CMYK and the new (CMYK)k constitute the conversion tables being sought and become basis for look up tables for conversion.

Variations to the above technique can be made. One variation is to add the step of under color addition (UCA) to compensate the loss of hue when K replaces the supposedly equivalent (CMY)p. When there is a loss of hue, the gamut, or color volume, is reduced. In this step, some of the removed CMY components are added back, in essence, reducing the replacement. When some of the color is added back in, the gamut is expanded out. For the block die, it has been shown that (1−K) is the correct compensation. For non-ideal dies, there is no standard factor and here the following compensation scheme is proposed, which leads to formation of new values for CMYK, designated as C"M"Y"K", as follows:

$$C'' = \frac{C'}{1-Ck} = \frac{C-Ck}{1-Ck}$$

$$M'' = \frac{M'}{1-Mk} = \frac{M-Mk}{1-Mk}$$

$$Y'' = \frac{Y'}{1-Yk} = \frac{Y-Yk}{1-Yk}$$

$$K'' = K' = K$$

If under color addition is used, these new (CMYK)" patches, instead of the (CMYK)' patches, are measured producing the new $(L^*a^*b^*)$" as before. Again, the $L^*a^*b^*$ values may differ from the previous values not only due to the black substitution, but also because of the under color addition. The $(L^*a^*b^*)p$ is inverted with (CMYK)" to $(L^*a^*b^*)$" relationship to form new (CMYK)" for use in the desired conversion table from CMYK to (CMYK)".

In the final step, when an $L^*a^*b^*$ value 140 is received as input, or an externally defined CMYK combination having a specified $L^*a^*b^*$ value, the look up table 144 is used to find the corresponding C"M"Y"K" value. An interpolation scheme is used to generate conversions from CMYK-to-$(L^*a^*b^*)$-to-CMYK using an $L^*a^*b^*$-to-CMYK table. Although the points of the $L^*a^*b^*$ lattice shift in the above described process, the color gamut size does not change greatly.

Figure 2:
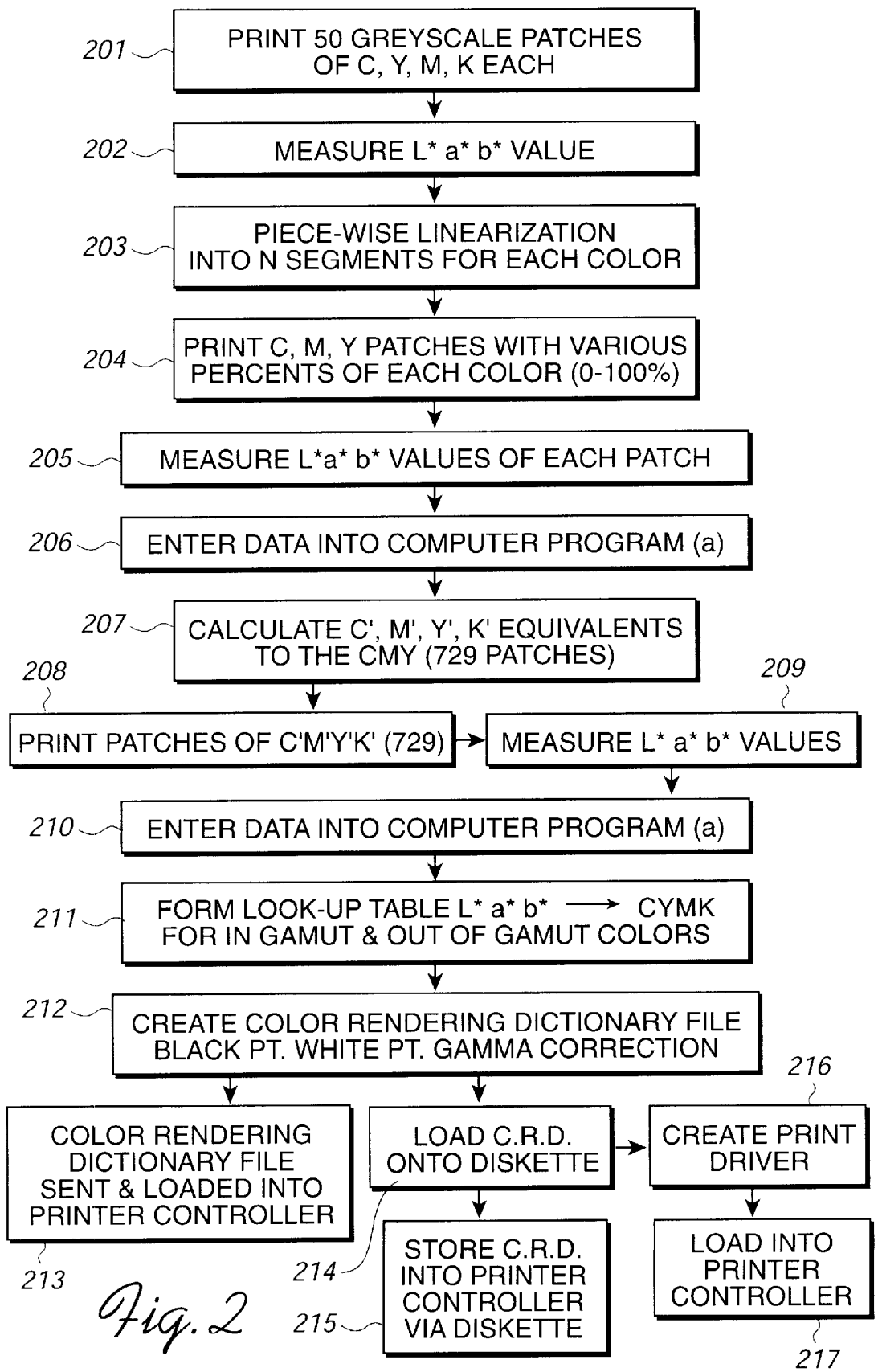
FIG. 2 illustrates a flow diagram of the process for creating a color rendering dictionary.
Figure 3A:
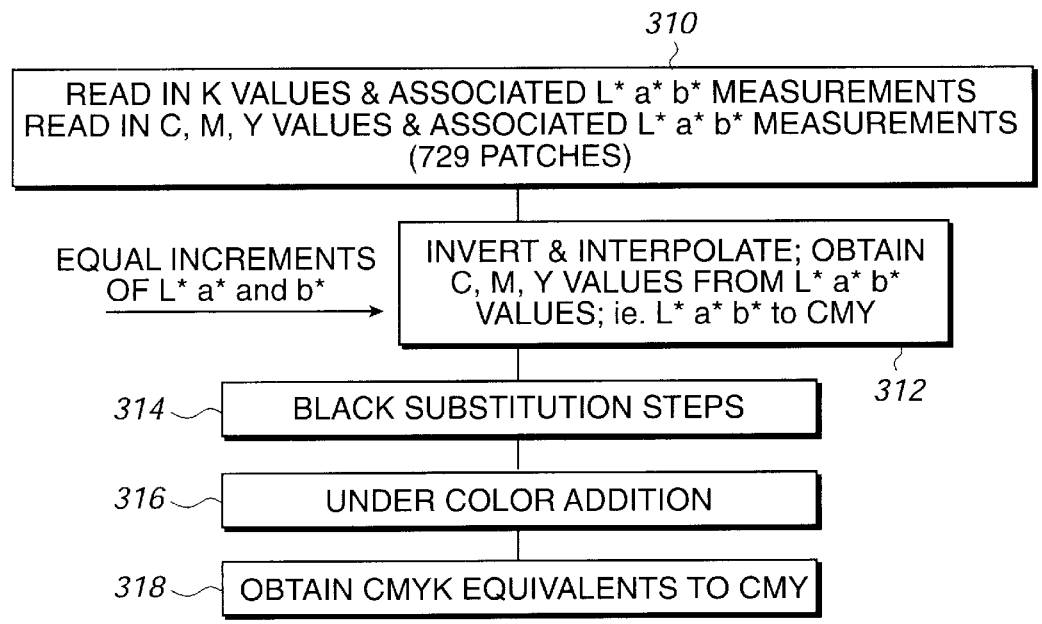
FIG. 3A is a computer program flow diagram for obtaining CMYK equivalents to CMY.

FIG. 2 illustrates a flow diagram of the process for creating a color rendering dictionary. First, 50 greyscale patches are printed of each C,M,Y,K, step 201. The $L^*a^*b^*$ of each patch is measured, step 202. Piece-wise linearization in $L^*$ into N segments (N=8 in the preferred embodiment) for each color is performed, step 203. Then C,M,Y patches with various percents of each color (0–100%) are printed (e.g., 729 patches), step 204. The $L^*a^*b^*$ values of each of these patches are measured, step 205. This data is then entered into a computer program, step 206. C',M',Y',K' equivalents to the patches of CMY are calculated, step 207, using the computer program as shown in FIG. 3A. Then, new patches of C',M',Y',K' are printed, step 208, and the patches are measured for their $L^*a^*b^*$ values, step 209. This data is entered into a computer program, step 210. A look up table is formed of $L^*a^*b^*$-to-CMYK for in gamut and out of gamut colors, step 211. A color rendering dictionary file is created having black point, white point, and gamma correction, step 212. The color rendering dictionary file can then be sent and loaded into a printer controller 213 or loaded onto a storage medium such as a diskette, step 214. If the color rendering dictionary is stored on a storage medium, the color rendering dictionary can be permanently stored into the printer controller via the storage medium, or it can be loaded into the printer controller by the print driver as required by the print job, 214–217.

FIG. 3A is a computer program flow diagram for obtaining CMYK equivalents to CMY. First, the K values and associated $L^*a^*b^*$ measurements from the greyscale patches are read in. The known CMY values from the printed CMY patches and associated $L^*a^*b^*$ values are read in, also, step 310. Using equal increments of $L^*a^*b^*$, C,M,Y values are obtained from the $L^*a^*b^*$ values by inverting and interpolating, i.e., $L^*a^*b^*$-to-CMY, step 312. Then the black substitution steps, step 314, and the under color addition steps, step 316, are carried out as described previously. From this, CMYK equivalents to CMY are obtained, step 318.

Figure 3B:
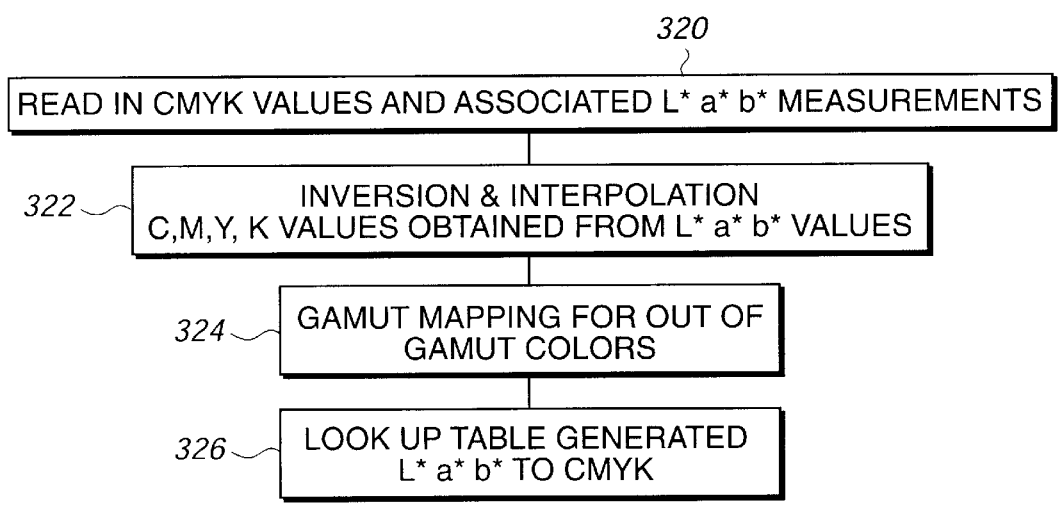
FIG. 3B is a computer program flow diagram for generating a look up table from a 3D color space to a 4D color space, e.g., $L^*a^*b^*$ to CMYK.

FIG. 3B is a computer program flow diagram for generating a look up table from a 3D color space to a 4D color space, e.g., $L^*a^*b^*$ to CMYK. First, the CMYK values used to print new patches are read in along with the associated $L^*a^*b^*$ measurements for those patches, step 320. Through inversion and interpolation, CMYK values are obtained from $L^*a^*b^*$ values in equally spaced increments, step 322. Gamut mapping is performed for out of gamut colors, step 324. Then, a look up table is generated for $L^*a^*b^*$ to CMYK, step 326. From this, a look up table can be generated from an externally defined CMYK four colorant combination having specified $L^*a^*b^*$ values to CMYK of the printer.

Figure 4:
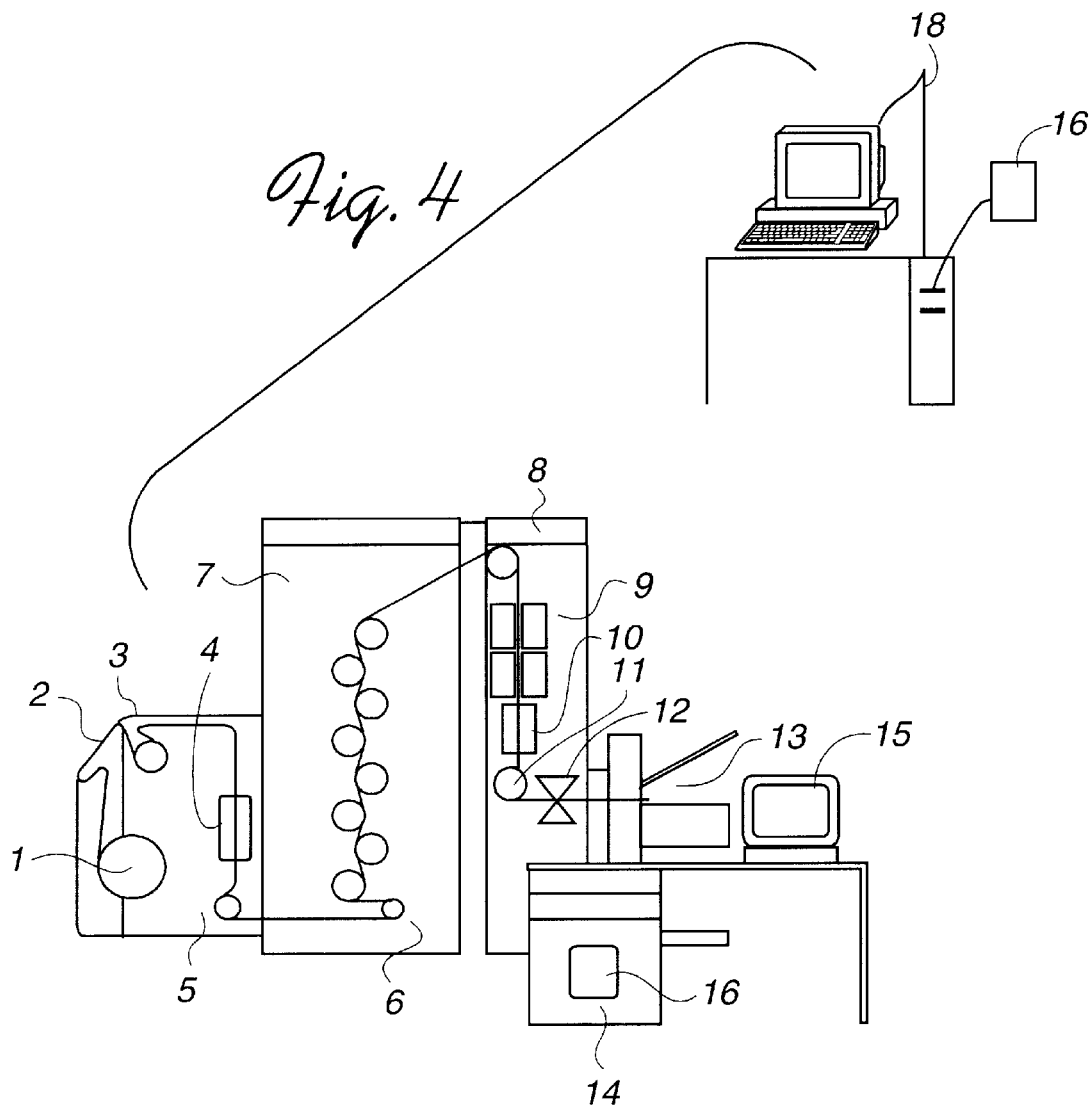
FIG. 4 is a block diagram of a printing system.

FIG. 4 is a block diagram showing a typical printing system for carrying out the features of the preferred embodiment of this invention. Also, this and other printing systems can be modified via the printer controller 14 to incorporate the features of the preferred embodiment of this invention. The printing system shown includes a paper reel 1, splicing table 2, paper drying roll 3, paper cooling 4, paper condition sensor 5, speed motor 6, printing stations 7, top roller 8, fuser 9, paper cooling 10, torque motor 11, cutter 12, and stacker 13. The printing station 7 comprises front and back printing engines for the various colors of ink used by the printer, such as cyan, magenta, yellow, and black. For more colors of ink, additional pairs of print engines would be contained within the printing station. The computer 18 is used to input the color rendering dictionary data as described for steps 206 and 210 of FIG. 2 in order to create the color rendering dictionary file 16 (FIG. 4) that is loaded into the printer controller 14.

In the preferred embodiment described above, only the K-substitutions are illustrated. However, the schemes equally apply to nonblack color substitution, and also to more than four colorants. For 5th colorants, for example, the same steps of substitutions are repeated converting 4-D to 5-D. The process of nonblack color substitution and the process of adding a 5th colorant are described below.

To convert to an additional color "A", where "A" can be any color, the following process is used which is similar to the process used for black substitution. First, greyscale patches of "A" are printed using various percentages of "A" ranging from 0% to 100% (e.g., approximately fifty patches may be printed in increments of 2% of color "A"). The $L^*a^*b^*$ value of each patch is measured.

A1:$(L^*a^*b^*)_{A1}$

A50:$(L^*a^*b^*)_{A50}$

From a previous printing of patches (e.g., 729 patches) of various combinations of CMY components for which each $L^*a^*b^*$ was measured, a CMY combination is found which yields the same $L^*a^*b^*$ values for each patch of "A" color.

A1:$(L^*a^*b^*)_{A1}$; $(CMY)_{A1}$

A50:$(L^*a^*b^*)_{A50}$;$(CMY)_{A50}$

For "A" color substitution, the known percentages of each of the components of any given CMY combination are examined in order to find the value of an "A" patch, Ai, that has one of its CMY components equal to, or near equal to but not greater than, one of the corresponding known components of the given CMY combination; while the other two components of Ai have a value lower than the other two corresponding CMY components of the given CMY combination.

For example, if "A" color substitution is desired for a given CMY combination which has C=10, M=25 and Y=40, it is found that a certain Ai has CMY values of C=10, M=20,and Y=35. The given CMY combination in terms of C, M, Y, and the fourth color "A" would result in C=0, M=5, Y=5, and A=the percentage of A used in the Ai patch.

To add a fifth color, e.g., "B", where "B" can be any color, or to add even more colors, an iterative process is used. The values for a five component color combination equivalent to the original given three component combination of CMY would be found by performing an iterative process of first finding the values for a four component color combination, i.e., CMYA, as discussed above, and then using the four component combination to derive the five component color combination. The first step is to perform the conversion from three colors to four colors, e.g., CMY-to-CMYA, as shown above. Less than a maximum "A" substitution scheme is preferred because one component being zero reduces the chance for a fifth component substitution. Then patches of the new (729) combinations of CMYA are printed and the $L^*a^*b^*$ values for each patch are measured. To convert from CMYA-to-CMYAB, greyscale patches are made of varying percentages of "B" color and the $L^*a^*b^*$ values are measured. Each "B" patch will have $L^*a^*b^*$ values that have equivalent CMYA values determined from corresponding $L^*a^*b^*$ values from the CMYA patches. Then for any given CMY combination, the components of the derived equivalent CMYA combination (equivalent to CMY described above) are examined to find a value of a "B" patch, Bi, that has one of its CMYA components equal to, or near equal to but not greater than, one of the corresponding components for the derived CMYA combination; while the other three components of Bi have a value lower than the other three corresponding components of the derived CMYA combination. Then the values of each of the CMYA components equivalent to the Bi patch are subtracted from each of the corresponding CMYA components of the derived CMYA combination to arrive at new values, C'M'Y'A', for the CMYA components of the five component color combination. The amount of the fifth color will be the percentage of B used to make the Bi patch.

The above-described process, including under color addition, can be tested and verified on a printer. First, an image of $L^*a^*b^*$ format can be printed using only CMY colors. Then, using CMYK converted according to the maximum K-substitution plus UCA, the same image can be printed and compared. The resulting match indicates the quality of the process as a conversion process.

The above process is performed once for any given printer. The resulting look up table is then stored in memory in the printer or in a communicatively linked computer. If at any point in time, data is received having $L^*a^*b^*$ values (or CMYK values that will be converted to $L^*a^*b^*$ values) that make up an image to be printed by the printer, the printing system uses the look up table to find the corresponding CMYK values (i.e., C"M"Y"K" values).

The above process may also have to be performed if an ink is used in the printer that no longer conforms to the color specification of the previous ink used. This can happen when a new ink is used from a different company which produces the ink using a different formula. An updated color rendering dictionary may be required in this case. Typically, the table remains accurate even for inks from different batches, if they are from the same company.

It is also assumed that the above process was performed with the printer calibrated, i.e., the registrations and the densities were all within specifications. In order to maintain accuracies while using the above generated look up table, the registrations and densities should be maintained according to the printer specifications.

Using the foregoing specification, the invention may be implemented as a machine, process, or article of manufacture by using standard programming and/or engineering techniques to produce programming software, firmware, hardware or any combination thereof.

Any resulting program(s), having computer readable program code, may be embodied within one or more computer usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using or selling the invention.

Memory devices include, but are not limited to, fixed (hard) disk drives, diskettes, optical disks, magnetic tape, semiconductor memories such as RAM, ROM, Proms, etc. Transmitting devices include, but are not limited to, the internet, intranets, electronic bulletin board and message/note exchanges, telephone/modem-based network communication, hard-wired/cabled communication network, cellular communication, radio wave communication, satellite communication, and other stationary or mobile network systems/communication links.

A machine embodying the invention may involve one or more printing systems and/or processing systems including, but not limited to, cpu, memory/storage devices, communication links, communication/transmitting devices, servers, I/O devices, or any subcomponents or individual parts of one or more printing systems and/or processing systems, including software, firmware, hardware or any combination or subcombination thereof, which embody the invention as set forth in the claims.

One skilled in the art of computer science will easily be able to combine the software created as described with appropriate general purpose or special purpose computer hardware or printer hardware to create a computer/printer system and/or computer/printer subcomponents embodying the invention and to create a computer/printer system and/or computer/printer subcomponents for carrying out the method of the invention.

While the preferred embodiment of the present invention has been illustrated in detail, it should be apparent that modifications and adaptations to that embodiment may occur to one skilled in the art without departing from the spirit or scope of the present invention as set forth in the following claims.

For example, any number of patches can be printed out and measured for its corresponding color value. A certain size matrix or specific percentage values are not required. Also, unequal increments of each color can be utilized, where the increments are based upon piecewise linear steps of each color. Although the invention has been described in terms of $L^*a^*b^*$, any color values, including device independent color values, can be used. Also, although the invention has been described and claimed in terms of CMYK (which typically refers to cyan, magenta, yellow, and black), other colors can be used for any one or all of these color components. In addition, the invention is applicable to converting three dimensional color spaces (e.g., $L^*a^*b^*$) and not just to converting three dimensional colorants (e.g., CMY) to more than three dimensional colorants. In other words, a three dimensional color space can be specified in terms of color values (e.g., $L^*a^*b^*$) or colorant values (e.g., CMY, RGB, etc.).

We claim:

1. A method for converting an externally defined four dimensional colorant into an equivalent four dimensional colorant having color components of a given printer, the method comprising:

measuring first color values of a first set of patches having predetermined combinations of varying percentages of three primary colors (known ABC values) printed by the given printer;

correlating each combination of known ABC values with the corresponding color values as input to a first inversion program for determining ABC values for any given color values;

measuring second color values of a second set of patches having predetermined varying percentages of a fourth colorant (D) printed by the given printer;

using the first inversion program to determine ABC values corresponding to the color values for the varying percentages of the fourth colorant;

using the determined ABC values corresponding to the second set of patches and the known ABC values of the first set of patches to determine an equivalent fourth colorant substitution for the first patches having new ABC values (A'B'C') and a corresponding percentage of the fourth colorant (D); and correlating each combination of A'B'C' and D with associated color values as input to a second inversion program for determining A'B'C' and D values for any given color values or equivalent values.

2. A method for converting an externally defined four dimensional colorant into an equivalent four dimensional colorant having color components of a given printer, the method comprising:

printing a plurality of first patches having predetermined combinations of varying percentages of three primary colors (known ABC values);

measuring each one of the first patches for first corresponding color values;

correlating each combination of known ABC values with the corresponding color values as input to a first inversion program for determining ABC values for any given color values;

printing a second plurality of patches having predetermined varying percentages of an additional fourth colorant;

measuring each one of the second patches for second corresponding color values;

using the first inversion program to determine ABC values corresponding to the color values for the second patches;

using the determined ABC values for the second patches and the known ABC values of the first patches to determine an equivalent fourth colorant substitution for the first patches having new ABC values (A'B'C') and a corresponding percentage of the fourth colorant (D); and correlating each combination of A'B'C' and D with associated color values as input to a second inversion program for determining A'B'C' and D values for any given color values or equivalent values.

3. The method of claims 1 or 2 wherein ABC represent percentages of color components comprising of cyan, magenta and yellow and wherein D represents a percentage amount of black.

4. The method of claims 1 or 2 wherein ABC represent percentages of color components comprising of cyan, magenta and yellow and wherein D represents a percentage amount of another fourth color.

5. A method for converting an externally defined four dimensional colorant into an equivalent four dimensional colorant having color components of a given printer, the method comprising:

printing a plurality of CMY patches having differing combinations of known percentages of CMY components (known CMY values);

printing a plurality of patches having differing combinations of known percentages of a fourth colorant;

measuring the $L^*a^*b^*$ values for each patch;

creating a substitution table which correlates a CMY designation ("(CMY)k") for each $L^*a^*b^*$ value associated with each patch of the fourth colorant;

correlating, for each CMY patch wherein each CMY component has a non-zero value, a value of a lowest value component with a corresponding component, from the substitution table, which results in the lowest value component approaching zero while avoiding a negative colorant when the values of the components of the CMY designation ("(CMY)k") from the substitution table are subtracted from the known CMY values; whereby resulting CMYK values (C'M'Y'K') are obtained as follows:

C'=C−Ck
   M'=M−Mk
   Y'=Y−Yk
   K'=K creating an inverted look up table having each C'M'Y'K' and associated $L^*a^*b^*$ value; and using the look up table to find or interpolate C'M'Y'K' component values to use in printing when a $L^*a^*b^*$ or equivalent value is received as input.

6. The method of claim 5 wherein K' represents a maximum substitution.

7. The method of claim 5 wherein the inverted look up table has regularly varied $L^*a^*b^*$ values and associated computed C'M'Y'K' values.

8. The method of claim 5 further comprising the step of performing under color addition in which some predetermined portion of substituted colorants are added back to the C'M'Y'K' values resulting in new values of C"M"Y"K"; and wherein the look up table is created having C"M"Y"K" values in place of the C'M'Y'K' values.

9. The method of claim 5 further comprising the steps of, after subtracting and obtaining C'M'Y'K' values, printing out a plurality of C'M'Y'K' having differing combinations of known percentages of C'M'Y'K' components; measuring the $L^*a^*b^*$ values for each C'M'Y'K' patch, and using the measured $L^*a^*b^*$ values and known percentages in the created look up table.

10. The method of claim 8 further comprising the steps of, after performing under color addition resulting in new values C"M"Y"K", printing out a plurality of C"M"Y"K" having differing combinations of known percentages of C"M"Y"K" components; measuring the $L^*a^*b^*$ values for each C"M"Y"K" patch, and using the measured $L^*a^*b^*$ values and known percentages in the created look up table.

11. A system for converting an externally defined four dimensional colorant (CMYK) into an equivalent four dimensional colorant (C'M'Y'K') having color components of a given printer, the system comprising:

a printer having more than three colored inks;

a printer controller for controlling the printer;

a computer having a program and input means for creating a color rendering dictionary file, for use by the printer controller, for correlating color values to the four component colorant;

the program having means for receiving first input parameters of varying percentage amounts of an additional fourth colorant and corresponding measured color values corresponding to each varied percentage amount of the additional fourth colorant printed by the given printer;

the program having means for receiving second input parameters of varying percentage amounts of three base colorants and corresponding measured color values corresponding to each varied percentage amounts of the three base colorants printed by the printer;

the program having means for determining equivalent three colorant values for each varied percentage amount of the additional fourth colorant based on both sets of measured color values and the varied percentage of the three base colorants printed by the printer;

the program having means for determining four colorant values equivalent to each varied percentage of the three base colorants printed by the printer;

the program having means for correlating four colorant values with color values of the three base colorants; and a color rendering dictionary file, in the printer controller, created from the correlated four colorant values and color values of the three base colorants, for determining corresponding four colorant values from the externally defined four dimensional colorant having the same color values.

12. A printing system for converting an externally defined four dimensional colorant (CMYK) into an equivalent four dimensional colorant (C'M'Y'K') having color components of a given printer, the printing system comprising:

a printing station having more than three different colored inks;

a printer controller for controlling the printing station; and a color rendering dictionary file, in the printer controller, for determining an equivalent four component colorant combination for the printer from a given three component colorant, the file further comprising:

color values correlated with varying percentages of the four component colorant combination (CMYK); and the varied percentages of CMYK determined from a) varied percentages of three colorants (CMY) printed by the printer, b) varied percentages of the fourth colorant printed by the printer, c) equivalent CMY values for each varied percentage of the fourth colorant based upon corresponding measured color values of the printed varied percentages of the three colorants and the printed varied percentages of the fourth colorant, and d) an equivalent CMYK value for each of the varied percentages of CMY printed by the printer based upon i) subtracting each component of the equivalent CMY values for one of the varied percentages of the fourth colorant from each component of one of the varied percentages of CMY without resulting in a negative colorant, and ii)

having a value of K equal to the percentage of the one of the varied percentages of the fourth colorant.

13. A file, on a medium for use in a printer controller of a printer, for converting an externally defined four dimensional colorant (CMYK) into an equivalent four dimensional colorant (C'M'Y'K') having color components of the printer, the file comprising:

color values correlated with varying percentages of the four component colorant combination; and the varied percentages of the four component colorant determined from a) varied percentages of three colorants printed by the printer, b) varied percentages of the fourth colorant printed by the printer, c) equivalent three colorant values for each varied percentage of the fourth colorant based upon corresponding measured color values of the printed varied percentages of the three colorants and the printed varied percentages of the fourth colorant, and d) equivalent four colorant values for each of the varied percentages of the three colorants printed by the printer based upon i) subtracting each component of the equivalent three colorant values for one of the varied percentages of the fourth colorant from each component of one of the varied percentages of the three colorants without resulting in a negative colorant, and ii) having a value of an equivalent fourth colorant equal to the percentage of the one of the varied percentages of the fourth colorant.

14. The file of claim 13 wherein the color values correlated with varying percentages of the four component colorant combination are measured color values of varying percentages of the four component colorant combination printed by the printer.

15. A program, on a computer usable medium, for generating a file for use in a printer controller of a printer for converting an externally defined four dimensional colorant (CMYK) into an equivalent four dimensional colorant (C'M'Y'K') having color components of the printer, the program comprising:

means for receiving first input parameters of varying percentage amounts of an additional fourth colorant and corresponding measured color values corresponding to each varied percentage amount of the additional fourth colorant printed by the given printer;

means for receiving second input parameters of varying percentage amounts of three base colorants and corresponding measured color values corresponding to each varied percentage amounts of the three base colorants printed by the printer;

means for determining percentage amounts of the three base colorants (three colorant values) for each varied percentage amount of the additional fourth colorant based on both sets of measured color values and the varied percentage amounts of the three base colorants printed by the printer;

means for determining percentage amounts of the three base colorants with the additional fourth colorant (four colorant values) equivalent to each varied percentage amounts of the three base colorants printed by the printer;

means for correlating the determined four colorant values with the measured color values of each of the equivalent varied percentage amounts of the three base colorants; and means for creating a look up table for finding correlated four colorant values for any given color values.

16. A program, on a computer usable medium, for generating a file for use in a printer controller of a printer for converting an externally defined four dimensional colorant (CMYK) into an equivalent four dimensional colorant (C'M'Y'K') having color components of the printer, the program comprising:

means for receiving first input parameters of varying percentage amounts of an additional fourth colorant and a first group of corresponding measured color values corresponding to each varied percentage amount of the additional fourth colorant printed by the given printer;

means for receiving second input parameters of varying percentage amounts of three base colorants and a second group of corresponding measured color values corresponding to each varied percentage amounts of the three base colorants printed by the printer;

means for determining percentage amounts of the three base colorants (colorant values) for each varied percentage amount of the additional fourth colorant based on the first and second groups of measured color values and the varied percentage amounts of the three base colorants printed by the printer;

means for determining the percentage amounts of the three base colorants with the additional fourth colorant (four colorant values) equivalent to each varied percentage amount of the three base colorants printed by the printer;

means for correlating the determined four colorant values with a third group of corresponding measured color values corresponding to patches printed by the printer consisting of varying percentages of the four colorants specified by the determined four colorant values; and means for creating a look up table for determining correlated four colorant values for any given color values.

17. A program, on a computer usable medium, for generating a file for use in a printer controller of a printer for converting an externally defined four dimensional colorant (CMYK) into an equivalent four dimensional colorant (C'M'Y'K') having color components of the printer, the program comprising:

means for receiving first input parameters of varying percentage amounts of an additional fourth colorant and corresponding measured $L^*a^*b^*$ values corresponding to each varied percentage amount of the additional fourth colorant printed by the given printer;

means for receiving second input parameters of varying percentage amounts of cyan, magenta, and yellow and corresponding measured $L^*a^*b^*$ values corresponding to each varied percentage amounts of cyan, magenta, and yellow printed by the printer;

means for determining CMY values for each varied percentage amount of the additional fourth colorant based on both sets of measured $L^*a^*b^*$ values and the varied percentage of cyan, magenta, and yellow printed by the printed; and means for determining CMYK values equivalent to each varied percentage of cyan, magenta, and yellow printed by the printer.

18. The computer program of claims 15, 16, or 17 wherein the four colorants are cyan, magenta, yellow, and an additional fourth color.

19. The computer program of claims 15, 16, or 17 wherein the four colorants are cyan, magenta, yellow, and black.

20. The computer program of claims 15, 16, or 17 wherein the means for determining the four colorant values comprises means for performing the fourth color substitution.

21. The computer program of claims 15, 16, or 17 wherein the means for determining the four colorant values comprises means for performing a fourth color substitution and means for performing under color addition.

22. The computer program of claims 15, 16, or 17 wherein the means for determining four colorant values (CMYK values) comprises means for subtracting one of the determined three colorant values (CMY values) of one of the varied percentage amounts of the additional fourth colorant from one of the varied percentages of the three base colorants, without resulting in any negative value, thereby resulting in a resulting value of CMY, (C'M'Y') and the percentage amount of the fourth colorant K, (C'M'Y'K).

23. The computer program of claim 22 wherein the means for determining CMYK values comprises means for causing a maximum additional fourth color substitution resulting in at least one of a CMY component having a lowest possible zero or near zero value without having a negative colorant.

* * * * *

UNITED STATES PATENT AND TRADEMARK OFFICE
CERTIFICATE OF CORRECTION

PATENT NO. : 6,137,594 Page 1 of 1
DATED : October 24, 2000
INVENTOR(S) : William Chesley Decker, Ho Chong Lee and Jack Louis Zable It is certified that error appears in the above-identified patent and that said Letters Patent is hereby corrected as shown below:

Column 13,
Between lines 49-50 and 55-56, add the following lines:
"   .
    .
    ."

Signed and Sealed this

Third Day of May, 2005

JON W. DUDAS
*Director of the United States Patent and Trademark Office*